June 9, 1964 M. DE VRIES 3,136,554

STEREOPHONIC PICK-UP

Filed June 27, 1960

Machiel de Vries
INVENTOR.

BY Fisher, Christen & Goodson
His Attorneys 3,136,554
Patented June 9, 1964

3,136,554
STEREOPHONIC PICK-UP

Machiel de Vries, Amsterdam, Netherlands, assignor to Ronette Piezo Electrische Industrie, N.V., Amsterdam, Netherlands, a corporation of the Netherlands Filed June 27, 1960, Ser. No. 38,774
Claims priority, application Netherlands July 1, 1959
14 Claims. (Cl. 274—37)

The present invention relates to a stereophonic pick-up comprising a casing in which two transducers are each locally secured and are each elsewhere connected with a common stylus holder by means of an elastic coupling means, said stylus holder carrying a stylus at its one end and being connected with the casing in another place.

In stereophonic pick-ups of this type the elastic coupling means are of a relatively light, thin and elongated construction in order to obtain as good as possible a separation between the vibrations originating from two sound tracks. The ends of the coupling means that are not connected with a transducer, are joined and the stylus holder bears against the junction.

It is known that such stylus holders owing to their contact with the sound tracks in addition to performing the desired vibrations in two planes enclosing an angle with each other also have the tendency to perform vibrations about their longitudinal axes which is attended by torsional deformations. Said vibratory motions which are the result of a couple acting on the stylus holder make themselves felt in the coupling means as unintentional vibrations which in turn result in undesirable tensions that are generated by the transducers.

The object of the invention is to provide a supporting means for the stylus holder which at least minimizes the influence of said vibrations about the longitudinal axis of the stylus holder.

To achieve this object according to the invention the connection between the stylus holder and the casing is formed by a bearing which counteracts rotations of the stylus holder about its longitudinal axis, the bearing engaging the stylus holder in a place located between the places where the stylus and where the coupling means are connected to the stylus holder respectivelly.

The bearing in addition to counteracting the rotations of the stylus holder about its longitudinal axis imparts a very great freedom of movement to said stylus holder. Owing thereto the stylus holder will be self-adjusting, so that said stylus holder may adapt itself to possible small deviations that may have come into being in the manufacture or the assembly of the pick-up. Such small deviations are levelled out by the self-adjustment of the stylus holder, so that the adverse influences that would occur otherwise, are substantially eliminated.

The bearing according to the invention preferably is at least partly made of a material that will damp mechanical vibrations.

The pick-up according to the invention may also be so constructed that the bearing consists of a piece of visco-elastic material secured in the casing and provided with a passage through which the stylus holder extends in fitting relationship therewith.

At the same time the pick-up according to the invention may be so constructed that the piece of visco-elastic material has an extension in which the passage continues and which extension ends in the coupling means.

According to another feature of the pick-up according to the invention the extension may be formed integral with the coupling means.

According to still another feature of the invention the construction of the pick-up may be such that beside the piece of visco-elastic material a resilient plate-shaped element is secured in the casing, the stylus holder extending through said plate-shaped element and being secured thereto.

A further feature of the pick-up according to the invention is that the bearing is formed by a pin depending from and secured in the casing, the stylus holder having a conical depression in which the point of the pin engages and by a piece of visco-elastic material located diametrically opposite the pin and bearing against the stylus holder, said piece of visco-elastic material being secured in the casing.

Finally the pick-up according to the invention may have for its feature that the bearing is formed by two conically depressed portions of the stylus holder located diametrically opposite each other and by two pointed projections secured diametrically opposite each other in the casing, which projections have their points in engagement with the depressed portions and which have a relatively large flexibility at least substantially in the directions of the longitudinal axis of the stylus holder.

The invention will be elucidated hereinafter with reference to the accompanying drawings showing a few embodiments. In said drawings.

Figures 1, 2, 3, 4, 5, 6, 7, 8:
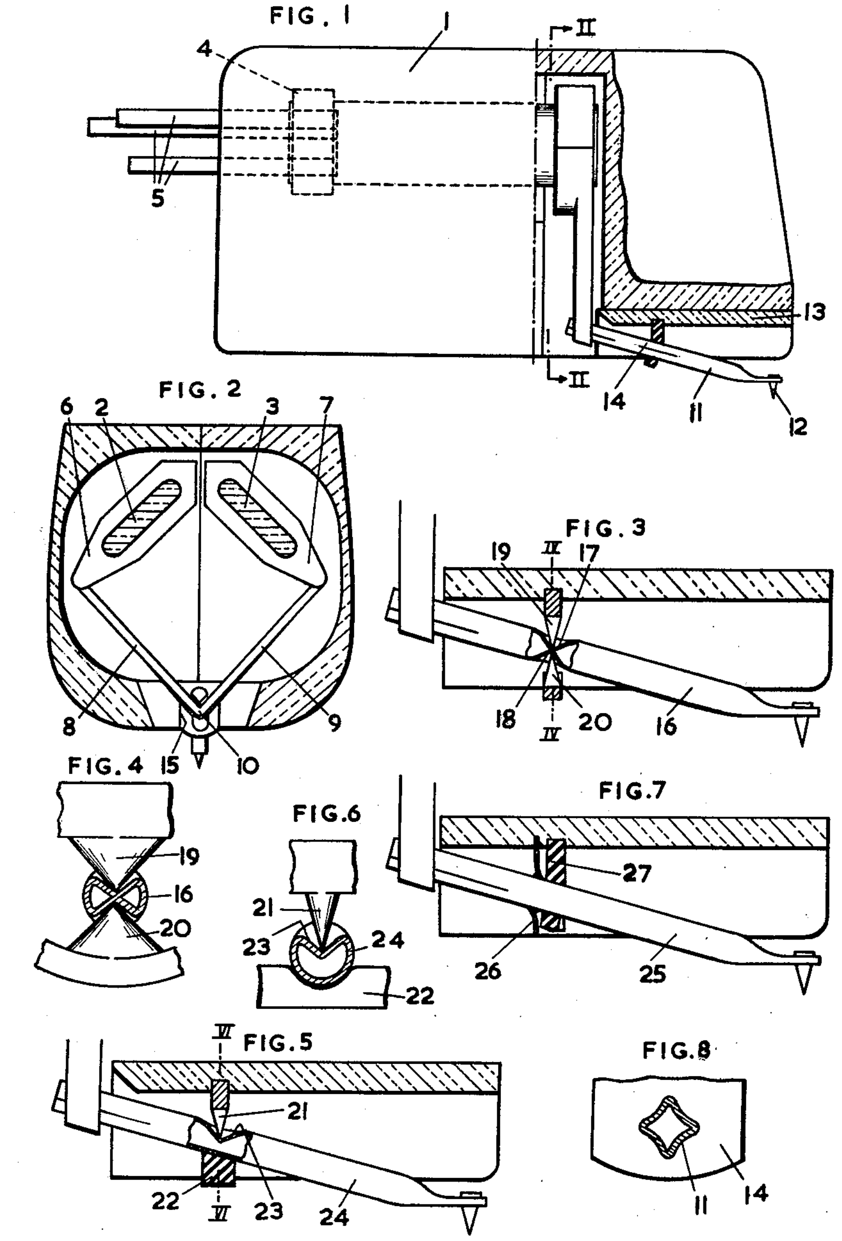
FIG. 1 is a diagrammatic elevation and partly a longitudinal sectional view respectively of a pick-up according to the invention.
FIG. 2 is a cross-sectional view on the line II—II in FIG. 1.
FIG. 3 is a side elevation of another embodiment of the bearing of the stylus holder shown on a larger scale.
FIG. 4 is a cross-sectional view on a still larger scale taken on the line IV—IV in FIG. 3.
FIG. 5 is a side elevation of the same type as shown in FIG. 3, but of a different embodiment.
FIG. 6 is a sectional view on the line VI—VI in FIG. 5.
FIG. 7 is a side view similar to the one shown in FIG. 3, but of another embodiment.
FIG. 8 is a cross-sectional view of the stylus holder as shown in FIG. 1, the cross-section being taken adjacent the bearing.

Two transducers 2 and 3 have their one ends clamped in a casing 1 at 4. The reference numeral 5 designates the terminals for the electric connection of the transducers. The free ends of the transducers 2 and 3 are surrounded by sleeves 6 and 7 respectively to which elongated coupling means 8 and 9 respectively are secured. Said coupling means consist of an elastic material, such as a synthetic material and they are joined together at 10. The coupling means 8 and 9 together enclose an angle which should be about equal to the angle enclosed by the planes in which the sound tracks on the record are provided.

As is known, it is the intention that each of the coupling means should only pass on the vibrations caused by one of the sound tracks, i.a., those vibrations which have the same direction as the longitudinal direction of the relative coupling means.

In order to realize this intention the stylus holder designated by the reference numeral 11 may only perform vibrations directed according to the longitudinal directions of the two coupling means. Now it has been found in actual practice that this intention is not realized. This is due to the fact that the stylus 12 secured to the stylus holder 11 has a certain length in a direction transversely of the longitudinal direction of the stylus holder 11. Seeing that the sound track acts on the extreme point of the stylus 12 a certain couple will also act on the stylus holder 11 therefor, which couple tries to turn or to twist the stylus holder 11 about its longitudinal axis. When said twisting about the longitudinal axis of the stylus holder still manifests itself at the place where the stylus holder bears against its junction 10 with the coupling means undesirable mechanical stresses will set up in the coupling means 8 and 9 as a result thereof. If, for example, in FIG. 2 the stylus holder performs a rotation about its longitudinal axis in clockwise direction the friction between the stylus holder and the coupling means will cause the coupling means 9 to be stretched and the coupling means 8 to be compressed. In consequence the mechanical stress in the coupling means 9 will be increased and the mechanical stress in the coupling means 8 will be decreased.

It will be clear that these mechanical stresses result in electric tensions at the connecting terminals 5, which tensions are undesirable and which make themselves felt as deformations. Hitherto it has been conventional to clamp the end of the stylus holder not carrying the stylus directly or indirectly in the casing, the place of contact between the stylus holder and the coupling means being located between the place where the stylus holder was clamped in the casing and the stylus.

It will be clear that even though the clamping of the stylus holder was a very rigid one a twisting of the stylus holder could occur all the same in the place where the stylus holder was connected with the coupling means.

According to the invention the means supporting the stylus holder in the casing is located between the places where the stylus and the coupling means respectively are secured to the stylus holder. Moreover this supporting means is in the form of a bearing and in this bearing a twisting of the stylus holder about its longitudinal axis is prevented.

Said bearing may be formed in various manner as may appear from the several embodiments shown.

In all the embodiments shown the bearing is secured in a supporting member 13 which is adapted to be slidingly moved into and out of a complementarily formed slot in the casing. In other embodiments, however, the bearing may also be fixed direct to the casing.

In the embodiment shown in FIG. 1 the bearing proper consists of a strip of resilient material 14 secured in the supporting member 13. The stylus holder 11 is substantially located in a longitudinal slot 15 provided in the supporting member 13.

As appears from FIG. 1 the stylus holder 11 passes through the bearing 14 and for this purpose said bearing is provided with a close fitting passage. The result of this fit, which, if desired, may be a somewhat clamping fit and also owing to the adhesive nature of the material of which the bearing consists, the stylus holder cannot rotate about its longitudinal axis relative to the bearing. If desired, such a rotation of the stylus holder may be counteracted even further by giving the stylus holder a substantially star-shaped circumference in cross-section, as shown on an enlarged scale in FIG. 8.

Because the bearing 14 is resilient the stylus holder 11 may perform upward and downward movements in all directions. If the stylus holder 11 is twisted by a couple acting on the stylus 12 a counter couple is created in the bearing 14, so that the end of the stylus holder bearing against the junction 10 of the coupling means 8 and 9 remains at rest relative to the longitudinal axis of said stylus holder.

In the embodiment according to FIGURES 3 and 4 two depressions 17 and 18 are provided in the stylus holder 16, which depressions are located diametrically opposite each other. In said depressions two points 19 and 20 bear which points are secured in the supporting member 13.

As may appear from a comparison of FIGS. 3 and 4 the points 19 and 20 are not symmetrically round, but they are thinner in the longitudinal direction of the stylus holder (vide FIG. 3) than in a direction normal thereto (vide FIG. 4). This difference has for its result that the points may relatively easily flex in the longitudinal direction of the stylus holder. The consequence thereof is that the stylus holder 16 may perform upward and downward movements in all possible directions, the points 19 and 20 each time flexing in directions that are opposite relative to each other, whereas nevertheless a rotation of the stylus holder about its longitudinal axis is not possible.

The embodiment according to FIGS. 5 and 6 comprises a point 21 and furthermore a resilient strip 22 which just as the bearing 14 of FIG. 1 is transversely secured in the slot 15. The strip 22 keeps the point 21 urged in a depression 23, so that in this case all of the upward and downward movements of the stylus holder 24 will take place about the extreme end of the point 21.

In the embodiment according to FIG. 7 the stylus holder 25 is secured in a metal plate 26 which again is secured transversely in the slot 15. This metal plate is in the form of a diaphragm and therefore admits of being flexed, as appears from FIG. 7. The stylus holder 25 is firmly secured in the corresponding opening in the plate 26, so that a rotation of the stylus holder 25 about its longitudinal axis is not possible. Beside the plate 26 a strip 27 consisting of a resilient material, e.g., a synthetic material, is arranged. The stylus holder 25 also passes through an opening in said strip 27.

Figure 9:
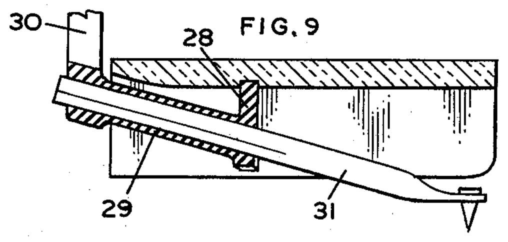
FIG. 9 is a side view similar to the one shown in FIG. 3, again, however, of a different embodiment.

The embodiment according to FIG. 9 shows a construction in which the bearing consisting of a strip of synthetic material 28 is connected with the coupling means 30 by means of a tubular extension 29. The strip 28, the extension 29 and the coupling means 30 consist here of a single piece of visco-elastic synthetic material. An important advantage of this construction is that the tubular extension 29 forms a guide for the stylus holder 31. Due to this guiding it is ensured that the end of the stylus holder 31 passed through the strip 28 will be brought in its correct place relative to the coupling means 30. This stands for a simplification of the assembly.

In all of the embodiments shown and described, with the exception of the embodiments according to FIGS. 3 and 4, at least a portion of the bearing consists of a resilient material which in addition has vibration damping properties. The presence of this vibration damping material has a favourable influence on other qualities of the stylus holder and the fact that there is a bearing for supporting the stylus holder may be utilized to advantage for accommodating the vibration damping material.

I claim:

1. In a binaural pick-up of the character in which a casing supports a pair of transducer means, said transducer means being driven by common coupling means, the combination including, stylus holder means having one end for operative engagement with said coupling means and being provided at the other end with laterally projecting stylus means, and anti-rotative universally pivotal bearing means connected between said stylus holder means intermediate the ends thereof and said casing, said common coupling means being provided with a driven portion, said one end of the stylus holder means being positioned in operative engagement with the driven portion of the common coupling means by said pivotal bearing means.

2. A pick-up according to claim 1, characterized in that the bearing means consists at least partly of material damping mechanical vibrations.

3. A pick-up according to claim 2, wherein said stylus holder means is provided with a conically shaped depression intermediate to length, said casing being provided with a downwardly projecting pin to be received in said depression, and a piece of visco-elastic material is attached to said casing to bear upwardly against said stylus holder means below said pin.

4. A pick-up according to claim 2, characterized in that the bearing means consists of a piece of visco-elastic material secured in the casing and provided with a passage through which the stylus holder means passes in fitting relationship therewith.

5. A pick-up according to claim 4, characterized in that the piece of visco-elastic material has an extension in which the passage continues, which extension ends in the coupling means.

6. A pick-up according to claim 5, characterized in that the extension is formed integral with said coupling means.

7. A pick-up according to claim 4, characterized in that beside the piece of visco-elastic material a resilient plate-shaped element is secured in the casing, the stylus holder extending through said plate-shaped element and being secured thereto.

8. A pick-up according to claim 2, characterized in that the bearing is formed by two conically depressed portions of the stylus holder located diametrically opposite each other and by two pointed projections secured diametrically opposite each other in the casing, which projections have their points in engagement with the depressed portions and which at least substantially in the directions of the longitudinal axis of the stylus holder have a relatively great flexibility.

9. In a replaceable stylus holder for use with sound recording pick-ups of the character which includes transducer means provided with coupling means to drive the transducer means, said coupling means being driven in at least one vibratory direction in a straight line, the combination comprising an elongated tubular metal shank, one extremity of said tubular member having opposed sides inwardly displaced in face-to-face relationship to provide a flat portion to support a stylus, the other extremity of the tubular member being adapted to operatively engage with said coupling means, at least a portion of said shank adjacent said other extremity having a substantially square cross-section, at least one pair of the opposed sides of the square cross-sectioned portion being disposed parallel with said one vibratory direction.

10. In a replaceable stylus holder for use with sound recording pick-ups of the character wherein the stylus holder is pivotally supported by a casing for operative engagement with transducer drive means, the combination including pivotal support means having a projecting pin member, an elongated tubular metal shank, one end of said shank being provided with a stylus, the other end of said shank being supported in engagement with said drive means by the pivotal support means, the surface of the shank being provided with a depressed portion intermediate the ends thereof to operatively engage with said pivotal support pin.

11. The invention as defined in claim 10, wherein the surface of said shank is provided with another depressed portion disposed diametrically opposite said first depression.

12. In a binaural pick-up means adapted to transform vibrations of a V-groove record track into electrical signals, each of the faces of said V-groove having separately impressed undulations, support means, a pair of transducer means having mounting portions and driven portions, means to attach the mounting portions of said transducer means to said casing to position said driven portions in side-by-side relationship, coupling means including at least two arm portions having a common pivotal juncture with one another, means to mount said coupling means to operatively position a portion of each said arm remote from said juncture in operative engagement with a respective driven portion of each said transducer means, stylus means including an elongated shank portion provided with a stylus at one end, pivotal mounting means connected to said shank medially of the ends thereof to support the other end of the shank in operative engagement with said juncture of the arm portions of said coupling means.

13. The invention as defined in claim 12, wherein said arm portions of the coupling comprise at least two elongated downwardly converging elements flexurally joined to one another at their lower ends, and said other end of the stylus shank is positioned to extend into the space defined by the area above said juncture to exert downwardly directed components of force on said coupling means in response to upward movements of said stylus.

14. The invention as defined in claim 12, wherein said coupling means is integrally formed of elastomeric material, and said pivotal mounting means for said shank includes an element formed of elastomeric material, one portion of said element being secured to the casing, another portion of said element being in supporting engagement with a medial portion of said shank.

References Cited in the file of this patent

UNITED STATES PATENTS

| | | |
|---|---|---|
| 2,616,709 | Lynch | Nov. 4, 1952 |
| 2,934,610 | Dieter | Apr. 26, 1960 |